(12) United States Patent
Futonagane et al.

(10) Patent No.: US 8,739,757 B2
(45) Date of Patent: Jun. 3, 2014

(54) LUBRICATION SYSTEM OF AN INTERNAL COMBUSTION ENGINE

(75) Inventors: Yoshinori Futonagane, Susono (JP);
Yuichi Shimasaki, Mishima (JP);
Takuya Hirai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/509,107

(22) PCT Filed: Nov. 13, 2009

(86) PCT No.: PCT/JP2009/069379
§ 371 (c)(1),
(2), (4) Date: May 10, 2012

(87) PCT Pub. No.: WO2011/058648
PCT Pub. Date: May 19, 2011

(65) Prior Publication Data
US 2012/0222647 A1  Sep. 6, 2012

(51) Int. Cl.
*F01M 5/00* (2006.01)

(52) U.S. Cl.
USPC .................................................. 123/196 AB

(58) Field of Classification Search
USPC .................................................. 123/196 AB
See application file for complete search history.

(56) References Cited

U.S. PATENT DOCUMENTS

| | | | |
|---|---|---|---|
| 6,053,143 A * | 4/2000 | Taylor | 123/196 AB |
| 7,204,230 B2 * | 4/2007 | Bevan et al. | 123/350 |
| 2009/0107424 A1 * | 4/2009 | Blassnitz et al. | 123/41.12 |
| 2011/0042967 A1 * | 2/2011 | Winter et al. | 290/1 R |

FOREIGN PATENT DOCUMENTS

| | | |
|---|---|---|
| JP | A-06-054409 | 2/1994 |
| JP | A-10-131732 | 5/1998 |
| JP | A-2002-174328 | 6/2002 |
| JP | A-2004-027991 | 1/2004 |
| JP | A-2004-270618 | 9/2004 |
| JP | A-2006-174543 | 6/2006 |
| JP | A-2008-088936 | 4/2008 |

OTHER PUBLICATIONS

International Search Report issued in International Application No. PCT/JP2009/069379 dated Feb. 9, 2010.

* cited by examiner

*Primary Examiner* — Lindsay Low
*Assistant Examiner* — Charles Brauch
(74) *Attorney, Agent, or Firm* — Oliff PLC (57) ABSTRACT

In a lubrication system of an internal combustion engine provided with a generator that generates electricity by making use of the power generated by the engine, and a heating mechanism that heats lubricating oil of the engine by making use of the energy generated when the generator carries out a power generation operation, a comparison is made between an amount of decrease of an engine load in cases where the heating mechanism heats the lubricating oil and an amount of increase of the engine load in cases where the generator carries out the power generation operation for the purpose of the operation of the heating mechanism, and permits the power generation operation of the generator in order to supply energy to the heating mechanism in cases where the amount of decrease of the engine load exceeds the amount of increase of the engine load.

13 Claims, 9 Drawing Sheets

LUBRICATION SYSTEM OF AN INTERNAL COMBUSTION ENGINE

TECHNICAL FIELD

The present invention relates to a lubrication system for an internal combustion engine, and in particular to a system which serves to warm lubricating oil by making use of electric power generated by a generator.

BACKGROUND ART

In a Patent Document 1, there is proposed a technique in which, in a system provided with a heater (oil heater) for heating lubricating oil (oil) of an internal combustion engine, and a heat exchanger (oil cooler) for cooling the lubricating oil, when the temperature of the lubricating oil is not more than a set value, the heater is caused to operate and at the same time the heat exchanger is made inoperative, whereas when the temperature of the lubricating oil exceeds the set value, the heater is made inoperative and at the same time the heat exchanger is caused to operate.

In a Patent Document 2 and a Patent Document 3, there is proposed a technique in which, in a system which performs regenerative power generation at the time of deceleration of a vehicle, a surplus amount of regenerative power which has not been charged to a battery is supplied to a heater for lubricating oil or a heater for an exhaust gas purification device.

PRIOR ART DOCUMENTS

Patent Documents

Patent Document 1: Japanese Patent Application Laid-Open No. H10-131732
Patent Document 2: Japanese Patent Application Laid-Open No. 2006-174543
Patent Document 3: Japanese Patent Application Laid-Open No. 2004-270618

DISCLOSURE OF THE INVENTION

Problem to be Solved by the Invention

However, in the technique disclosed in the Patent Document 1, in cases where the heater is caused to operate by the electrical energy generated by means of the generator (or electric motor), there will be a possibility that an increase in the engine load due to an increase in the amount of power generation of the generator may exceed an amount of reduction in friction due to the heating of the lubricating oil. In such a case, there will also be another possibility that an amount of increase in the fuel consumption due to the increase in the engine load may become larger than an amount of decrease in the fuel consumption due to the reduction in the friction of the internal combustion engine.

In addition, in the technique disclosed in the Patent Documents 2 and 3, in cases where the frequency in which the vehicle will be in a deceleration state is low, or in cases where the time of a deceleration state is short, or in cases where the amount of charge in the battery is small, etc., there will be a possibility that the frequency of the operation of the heater may become low. In that case, there will also be another possibility that the time until the temperature of the lubricating oil of the internal combustion engine rises to a suitable temperature may become long.

The present invention has been made in view of the above-mentioned actual circumstances, and its object is the provision of a technique in which, in a lubrication system of an internal combustion engine which is provided with a generator that generates electricity by making use of the power generated by the internal combustion engine, and a heating mechanism that heats lubricating oil of the internal combustion engine by making use of the energy generated when the generator carries out a power generation operation, a reduction in the friction of the internal combustion engine can be achieved while avoiding an increase in the fuel consumption thereof.

Means for Solving the Problem

In order to solve the above-mentioned problems, the present invention is provided with a generator that generates electricity by making use of the power generated by an internal combustion engine, and a heating mechanism that heats lubricating oil of the internal combustion engine by making use of the energy generated when the generator carries out a power generation operation, wherein a comparison is made between an amount of decrease of an engine load in cases where the heating mechanism heats the lubricating oil and an amount of increase of the engine load in cases where the generator carries out the power generation operation for the purpose of the operation of the heating mechanism, and in cases where the amount of decrease of the engine load exceeds the amount of increase of the engine load, the power generation operation of the generator for the purpose of supplying energy to the heating mechanism is permitted.

Specifically, a lubrication system of an internal combustion engine according to the present invention is provided with:
a generator that generates electricity by making use of the power generated by the internal combustion engine;
a heating mechanism that heats lubricating oil of the internal combustion engine by making use of the energy generated when said generator carries out a power generation operation;
a first detection unit that detects the temperature of the lubricating oil before the lubricating oil passes through said heating mechanism;
a first calculation unit that calculates an amount of decrease of an engine load due to the heating of the lubricating oil by said heating mechanism by the use of a detected value of said first detection unit as a parameter;
a second calculation unit that calculates an amount of increase of the engine load due to the power generation operation of the generator which is carried out in order to supply the energy to said heating mechanism; and
a control unit that permits said generator to carry out the power generation operation in order to supply energy to said heating mechanism in cases where a result of the calculation of said first calculation unit exceeds a result of the calculation of said second calculation unit.

The lubricating oil of the internal combustion engine has a tendency for its viscosity to become high when the temperature thereof is low. For that reason, when the temperature of the lubricating oil is low, the friction of the internal combustion engine increases. When the friction of the internal combustion engine is large, the engine load increases, so a deterioration in fuel economy (an increase in the fuel consumption) will be caused.

In contrast to this, when the heating mechanism operates at the time the lubricating oil is low, the friction of the internal combustion engine becomes lower according to the temperature rise of the lubricating oil. When the friction of the internal combustion engine becomes lower, the engine load become smaller, so the fuel consumption of the internal combustion engine decreases. However, when the heating mechanism operates at the time a load is applied to the internal combustion engine (hereinafter referred to as a "loaded state"), there has been a fear that the engine load might rather increase due to an increase in the power generation of the generator, and the fuel consumption might increase accordingly.

However, as a result of keen and earnest experiments and verification carried out by the inventor of the subject application, it has been found out that in cases where a heating mechanism operates (i.e., the amount of electric power generated by a generator increases) at the time when the temperature of lubricating oil is low, an amount of decrease of an engine load due to a temperature rise of the lubricating oil may exceed an amount of increase of the engine load due to an increase in the amount of the power generation.

Accordingly, the lubrication system of an internal combustion engine of the present invention makes, before causing the heating mechanism to operate, a comparison between the amount of decrease of the engine load due to the heating of the lubricating oil by the heating mechanism and the amount of increase of the engine load due to the power generation operation carried out by the generator in order to supply energy to the heating mechanism, and permits the power generation operation of the generator for the purpose of supplying energy to the heating mechanism in cases where the amount of decrease of the engine load exceeds the amount of increase of the engine load.

According to such an invention, even in cases where the internal combustion engine is in the loaded state, it becomes possible to reduce the friction of the internal combustion engine without inducing an increase in the fuel consumption.

In the present invention, heat energy can be used as the energy generated when the generator carries out the power generation operation. In that case, as the heating mechanism, there can be used a heat exchange mechanism that transmits to the lubricating oil the heat energy generated when the generator carries out the power generation operation. That is, for the heating mechanism, there can be used a mechanism that carries out heat exchange between the generator and the lubricating oil.

Here, note that in cases where the result of the calculation of the first calculation unit is less than the result of the calculation of the second calculation unit, heat energy may be supplied to the heating mechanism from the generator by causing the generator to carry out regenerative power generation under a condition in which the generator becomes able to perform regenerative power generation. In that case, becomes difficult to raise the temperature of the lubricating oil immediately, but it becomes possible to heat the lubricating oil, while suppressing an increase in the fuel consumption due to an increase in the engine load.

As the case where a condition that the generator is able to carry out regenerative power generation is satisfied, there can be exemplified a case in which the internal combustion engine is in a deceleration operating state, in other words, a case in which the internal combustion engine is rotating by receiving the rotational force of a drive wheel(s) of a vehicle.

In addition, in the present invention, electrical energy can be used as the energy generated when the generator carries out the power generation operation. In that case, as the heating mechanism, there can be used an electric heater that converts the electrical energy generated by the generator into heat energy and transmits it to the lubricating oil. Further, as the heating mechanism, there can also be used a mechanism that includes a heat exchange mechanism that transmits to the lubricating oil the heat energy generated when the generator carries out the power generation operation, and an electric heater that converts the electrical energy generated by the generator into heat energy and transmits it to the lubricating oil.

In a construction in which the heating mechanism includes the electric heater, in cases where the result of the calculation of the first calculation unit is less than the result of the calculation of the second calculation unit, the electric heater may be caused to operate by making use of the electrical energy of the battery. In that case, it is possible to heat the lubricating oil, while suppressing an increase in the fuel consumption due to an increase in the engine load.

However, in cases where an amount of charge stored in the battery is less than a preset specified amount, the generator is caused to carry out regenerative power generation under a condition in which the generator becomes able to perform regenerative power generation, and at the same time the energy generated by the generator is supplied to the heating mechanism. The above-mentioned preset specified amount is a lower limit value of an amount of charge at which it is considered that an amount of charge in the battery does not become short even if the electric heater is caused to operate by making use of the electrical energy of the battery.

In that case, it becomes difficult to raise the temperature of the lubricating oil immediately, but it becomes possible to heat the lubricating oil, while suppressing an increase in the fuel consumption due to an increase in the engine load.

In the present invention, the heating of the lubricating oil by means of the heating mechanism (the supplying of energy from the generator to the heating mechanism) should be stopped in cases where the temperature of the lubricating oil after passing through the heating mechanism exceeds a preset upper limit temperature. The upper limit temperature referred to herein corresponds to an upper limit value of a temperature at which it is considered to be necessary to heat the lubricating oil.

Here, note that in the present invention, the first calculation unit may calculate an amount of decrease of the fuel consumption, instead of calculating the amount of decrease of the engine load. In that case, the second calculation unit should calculate an amount of increase of the fuel consumption, instead of calculating the amount of increase of the engine load.

Effects of the Invention

According to the present invention, in a lubrication system of an internal combustion engine which is provided with a generator that generates electricity by making use of the power generated by the internal combustion engine, and a heating mechanism that heats lubricating oil of the internal combustion engine by making use of the energy generated when the generator carries out a power generation operation, a reduction in friction can be achieved while avoiding an increase in the fuel consumption of the internal combustion engine.

THE BEST MODE FOR CARRYING OUT THE INVENTION

Hereinafter, specific embodiments of the present invention will be described based on the attached drawings. Here, note that the dimensions, materials, shapes, relative arrangements and so on of component parts described in the embodiments are not intended to limit the technical scope of the present invention to these alone in particular as long as there are no specific statements.

First Embodiment

Figure 1:
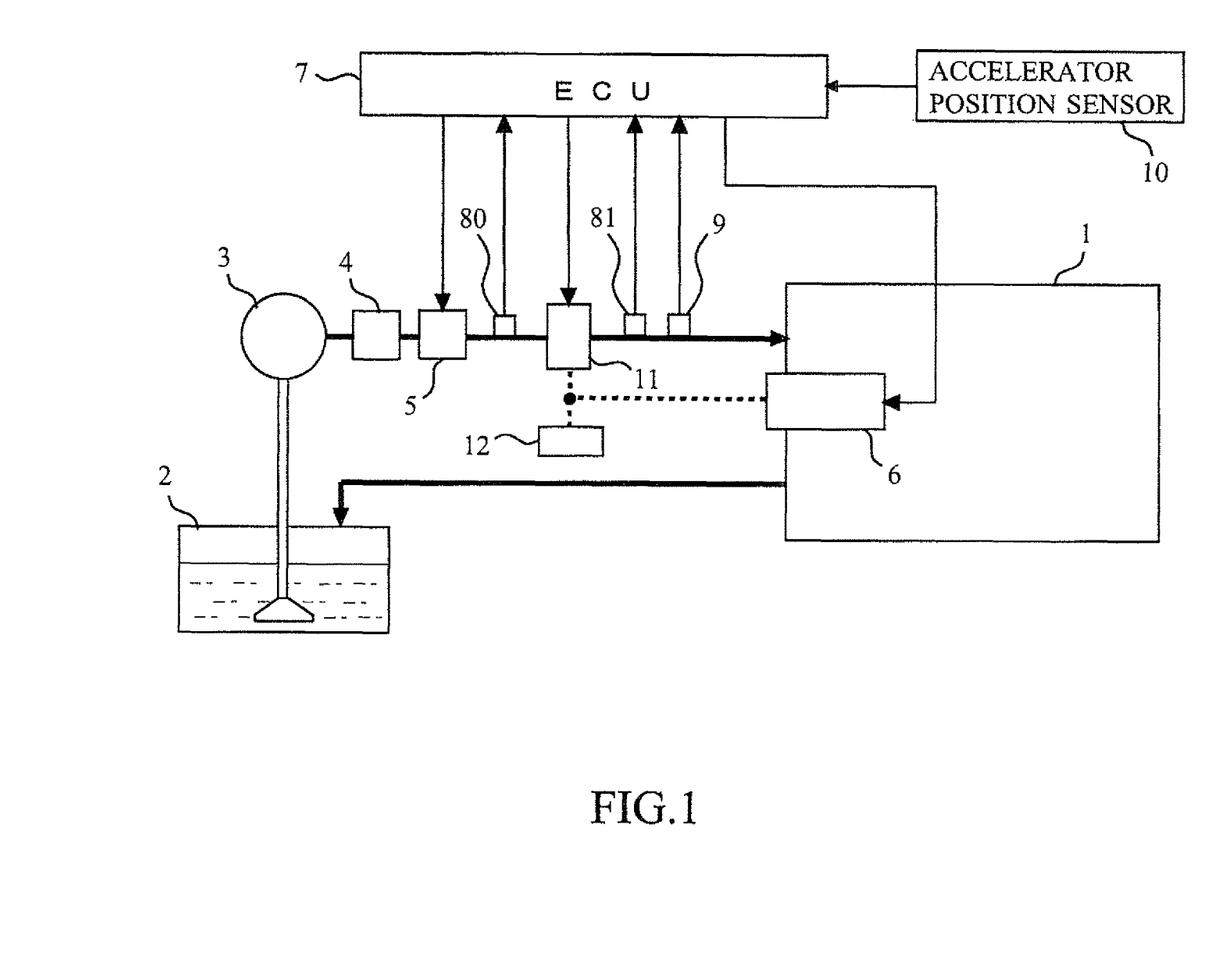
FIG. 1 is a view showing the schematic construction of a lubrication system of an internal combustion engine in a first embodiment.

First of all, reference will be made to a first embodiment of the present invention based on FIGS. 1 through 6. FIG. 1 is a view showing the schematic construction of a lubrication system of an internal combustion engine. In FIG. 1, the lubrication system of an internal combustion engine is provided with a lubricating oil storage tank 2 for storing oil as lubricating oil of an internal combustion engine 1. The lubricating oil storage tank 2 may be an oil pan mounted on a lower part of the internal combustion engine 1, or may be a tank which is arranged separately from the internal combustion engine 1.

The oil stored in the lubricating oil storage tank 2 is sucked up by a lubricating oil pump 3, and is delivered toward the internal combustion engine 1. The oil delivered from the lubricating oil pump 3 is supplied to the internal combustion engine 1 by way of an oil filter 4, an oil cooler 5, and an oil heater 11 in a sequential manner. The oil supplied to the internal combustion engine 1 returns to the lubricating oil storage tank 2, after passing through an unillustrated oil passage.

Here, the above-mentioned lubricating oil pump 3 is a mechanical pump which is connected to an output shaft (crankshaft) of the internal combustion engine 1 through a belt or gear so that it is driven to operate by the rotational energy of the crankshaft, or an electric pump which is driven to operate by the rotational energy of an electric motor. The above-mentioned oil filter 4 is a filtering device which removes solid particles contained in the oil.

Figure 2:
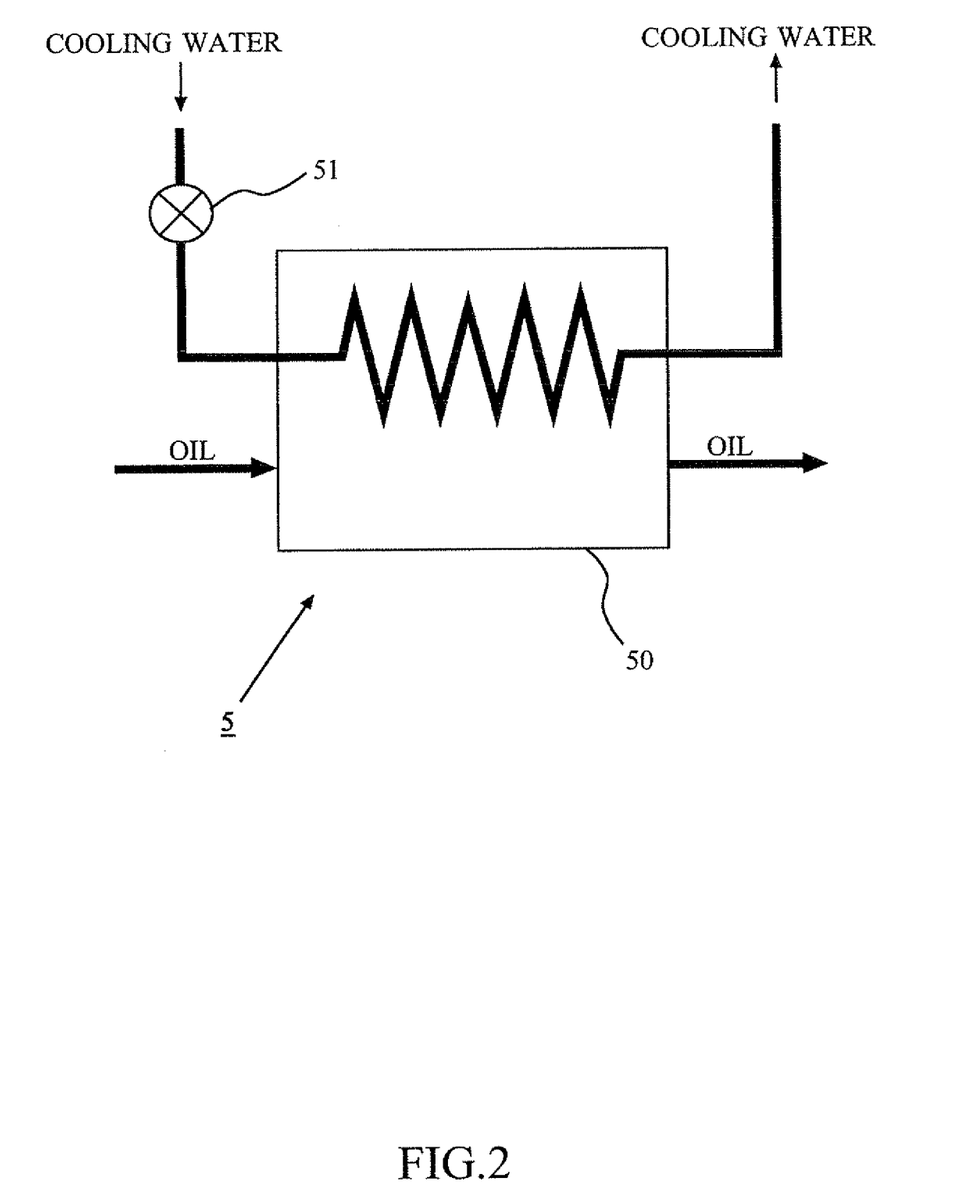
FIG. 2 is a view schematically showing the construction of an oil cooler.

The above-mentioned oil cooler 5 is a mechanism for cooling the oil. The oil cooler 5 of this embodiment is provided with a heat exchanger 50 that carries out heat exchange between the cooling water of the internal combustion engine 1 and the oil, and a flow rate regulating valve 51 that regulates the amount of the cooling water which flows into the heat exchanger 50, as shown in FIG. 2. The flow rate regulating valve 51 is an electrically operated type flow rate regulating valve which is driven to open and close by means of a step motor, a solenoid, etc. Here, note that as the flow rate regulating valve 51, there can also be used a thermostat type valve which is closed (blocked) when the temperature of the oil is less than a fixed temperature, and is opened when the temperature of the oil is equal to or higher than the fixed temperature.

In addition, as the oil cooler 5, there may also be used an oil cooler which is provided with an air cooled type heat exchanger, a bypass passage which allows the oil to flow along while bypassing the heat exchanger, and a changeover valve that passes the oil to either one of the heat exchanger and the bypass passage. The changeover valve may be an electrically operated type valve which is driven to open and close by a step motor, a solenoid, etc., or may be a thermostat type valve which carries out a change-over operation in accordance with the temperature of the oil.

The oil heater 11 is a heating device for heating the oil. This oil heater 11 is an electric type heating device which heats the oil by converting electrical energy into heat energy. The oil heater 11 is one form of embodiment of a heating mechanism according to the present invention.

Then, on the internal combustion engine 1, there is mounted an alternator 6, which is connected to the unillustrated output shaft (crankshaft) of the internal combustion engine 1 through a belt, etc., for converting the kinetic energy (rotational energy) transmitted thereto from the output shaft into electrical energy. The electrical energy generated by the alternator 6 is supplied to the battery 12 or the oil heater 11.

An ECU 7 for controlling the internal combustion engine 1 and the variety of kinds of equipment as referred to above is provided in combination with the lubrication system of an internal combustion engine as constructed in this manner. The ECU 7 is an electronic control unit which includes a CPU, a ROM, a RAM, a backup RAM, and so on.

A variety of kinds of sensors such as a first oil temperature sensor 80, a second oil temperature sensor 81, an oil pressure sensor 9, an accelerator position sensor 10, and so on are electrically connected to the ECU 7. The first oil temperature sensor 80 is a sensor which detects the temperature (first oil temperature-Toil1) of the oil flowing into the oil heater 11, and is arranged in an oil passage between the oil cooler 5 and the alternator 6. The second oil temperature sensor 81 is a sensor which detects the temperature (second oil temperature Toil2) of the oil having flowed out of the oil heater 11, and is arranged downstream of the oil heater 11 in the direction of the flow of the oil. The oil pressure sensor 9 is a sensor which detects the pressure (oil pressure Poil) of the oil flowing into the internal combustion engine 1. The accelerator position sensor 10 is a sensor which outputs an electrical signal corresponding to an amount of operation (accelerator opening) of an unillustrated accelerator pedal.

Figure 3:
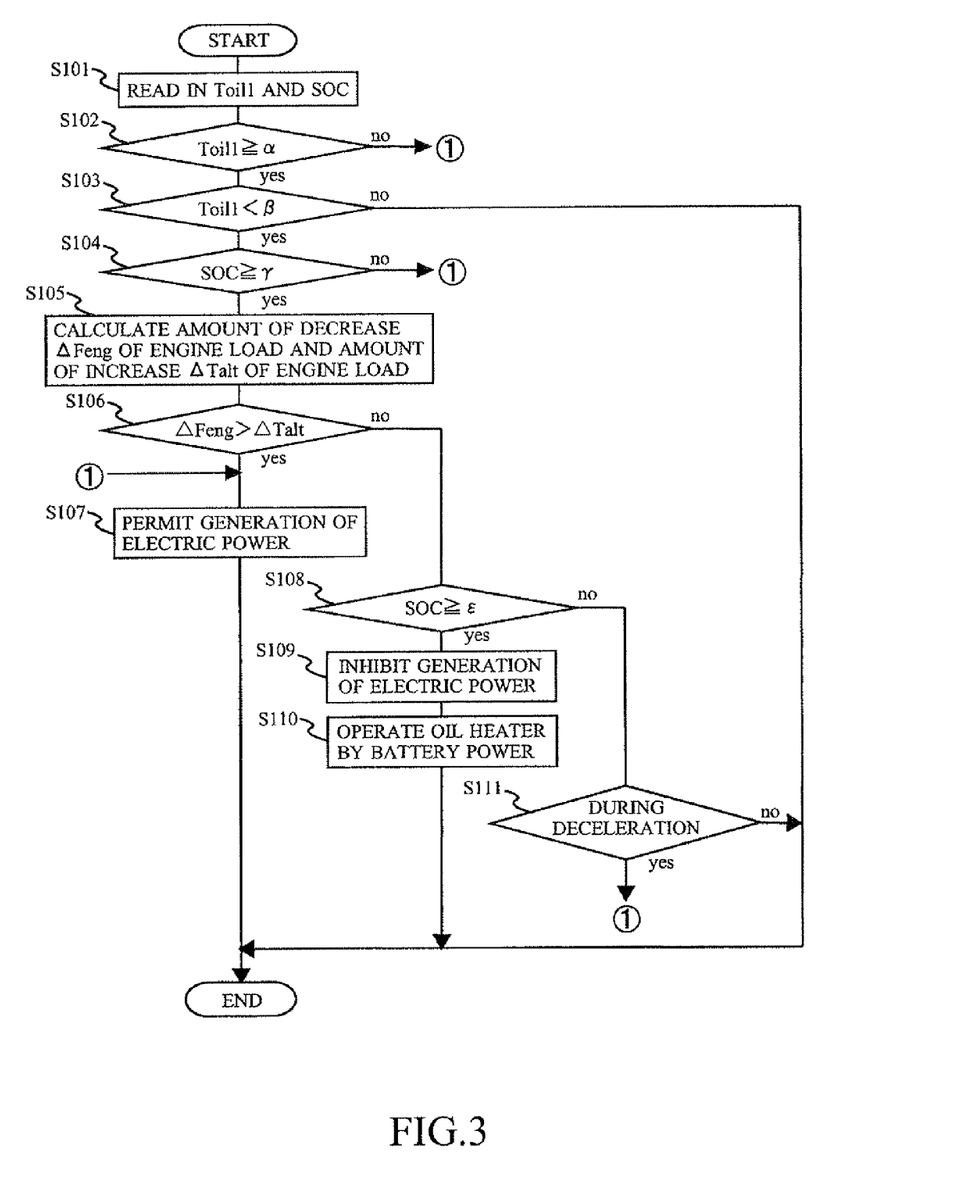
FIG. 3 is a flow chart showing an oil temperature control routine in the first embodiment.

The ECU 7 electrically controls the oil cooler 5, the alternator 6, and the oil heater 11 based on the output signals of the above-mentioned variety of kinds of sensors. For example, the ECU 7 controls the oil cooler 5, the alternator 6, and the oil heater 11 according to an oil temperature control routine as shown in FIG. 3. The oil temperature control routine is a routine which has been beforehand stored in the ROM of the ECU 7, etc., and is executed by the ECU 7 in a periodic manner.

In the oil temperature control routine of FIG. 3, the ECU 7 first executes the processing of S101. In S101, the ECU 7 reads in the output signal (first oil temperature) Toil1 of the first oil temperature sensor 80 and an amount of charge SOC of the battery 12.

In S102, the ECU 7 determines whether the first oil temperature Toil1 thus read in the above-mentioned step S101 is higher than a first predetermined temperature α. The first predetermined temperature α is an upper limit value of a temperature at which it is considered that an amount of decrease of the engine load due to the operation of the oil heater 11 certainly becomes larger than an amount of increase of the engine load due to an increase in the amount of power generation of the alternator 6 accompanying the operation of the oil heater 11. For that reason, in cases where a negative determination is made in this step S102 (Toil1<α), the ECU 7 goes to step S107 and permits the power generation of the alternator 6. That is, the heating of the oil by the oil heater 11 is permitted.

On the other hand, in cases where a positive determination is made in the above-mentioned step S102 (Te≥α), the ECU 7 proceeds to S103. In S103, the ECU 7 determines whether the first oil temperature Toil1 thus read in the above-mentioned step S101 is lower than a second predetermined temperature β. The second predetermined temperature β is a lower limit value of a temperature range in which it is considered to be unnecessary to carry out the heating of the oil by the oil heater 11 (in other words, an upper limit value of a temperature range in which it is considered to be necessary to carry out the heating of the oil by the oil heater 11).

In cases where a negative determination is made in the above-mentioned step S103n (Toil1≥β), the heating of the oil by the oil heater 11 is unnecessary, so the ECU 7 once ends the execution of this routine. In that case, the operation of the alternator 6 intended for the operation of the oil heater 11 is stopped. On the other hand, in cases where a positive determination is made in the above-mentioned step S103 (Toil1<β), the ECU 7 proceeds to S104.

In S104, the ECU 7 determines whether the amount of charge SOC read in the above-mentioned step S101 is equal to or larger than a third predetermined value γ. The third predetermined value γ is a lower limit value of the amount of charge at which it is considered unnecessary to carry out the charging of the battery 12, and is a value that has been beforehand obtained experimentally.

In cases where a negative determination is made in the above-mentioned step S104 (SOC<γ), the charging of the battery 12 becomes absolutely necessary, so the ECU 7 proceeds to S107. In S107, the ECU 7 permits the power generation of the alternator 6. The amount of power generation in that case is set to an amount capable of providing the charging to the battery 12 and the operation of the oil heater 11. As a result, it becomes possible to raise the temperature of the oil, while increasing the amount of charge of the battery 12, though there is a possibility that the engine load may be increased.

In cases where an affirmative determination is made in the above-mentioned step S104 (SOC≥γ), the ECU 7 advances to S105. In S105, the ECU 7 calculates an amount of decrease of the engine load due to the temperature rise of the oil by the oil heater 11 (a value obtained by converting an amount of decrease of friction into an amount of decrease of the engine load (torque)) ΔFeng, and an amount of increase ΔTalt of the engine load (torque) due to the power generation operation of the alternator 6 which is carried out in order to supply electrical energy to the oil heater 11.

The amount of increase ΔTalt of the engine load due to the power generation operation of the alternator 6 can be calculated by the use of the value of an excitation current applied to the alternator 6 and a power generation voltage of the alternator 6 as parameters. In that case, the relation among the excitation current, the power generation voltage, and the engine load which is required to drive the alternator 6 may have been beforehand obtained experimentally.

The amount of decrease ΔFeng of the engine load due to the temperature rise of the oil by the oil heater 11 can be calculated by the use of the first oil temperature Toil1 as a parameter. Here, a method to calculate the amount of decrease ΔFeng of the engine load is explained based on FIGS. 4 through 6.

The ECU 7 first calculates the engine load (hereinafter referred to as a "reference load") in a prescribed number of engine revolutions per unit time (hereinafter referred to as a "reference number of revolutions") by the use of the output signal (first oil temperature Toil1) of the first oil temperature sensor 80, and the output signal (oil pressure Poil) of the oil pressure sensor 9 as parameters.

Figure 4:
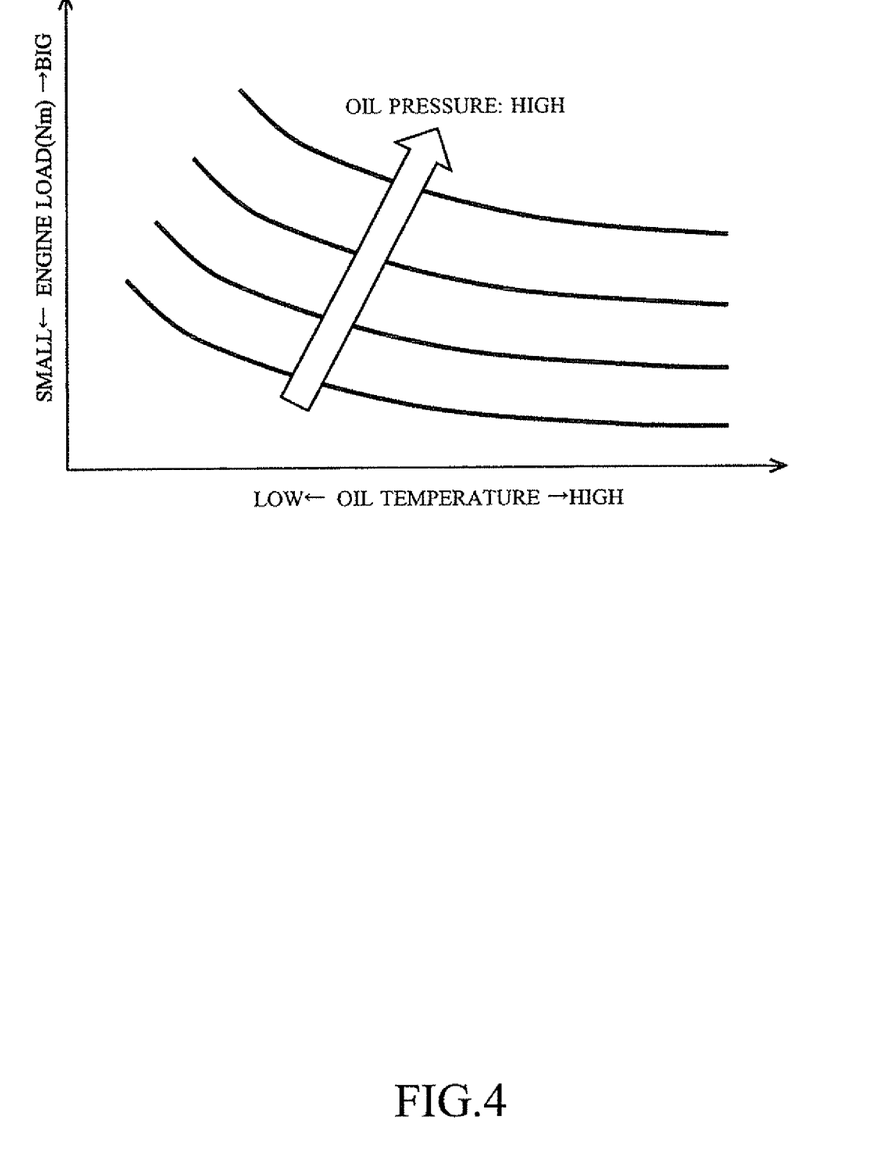
FIG. 4 is a view showing the relation among an oil temperature, an oil pressure and an engine load in a reference number of revolutions.

Under a condition in which the number of engine revolutions per unit time is constant, the engine load tends to become larger in accordance with the lower oil temperature and the higher oil pressure, as shown in FIG. 4. Accordingly, in this embodiment, the relation among the oil temperature and the oil pressure in the reference number of revolutions, and the reference load has been beforehand obtained experimentally, and has been mapped.

The ECU 7 can calculate the reference load (hereinafter referred to as a "first reference load Foil01") by the use of the output signal (first oil temperature Toil1) of the first oil temperature sensor 80 and the output signal (oil pressure Poil) of the oil pressure sensor 9 as arguments, by making use of a map shown in FIG. 4.

Here, note that there is a high possibility that the number of engine revolutions per unit time (hereinafter referred to as an "actual number of engine revolutions") at the time when the first oil temperature Toil1 and the oil pressure Poil are measured may be different from the reference number of revolutions. For that reason, in cases where the actual number of engine revolutions is different from the reference number of revolutions, it is necessary to correct the first reference load Foil01 based on the actual number of engine revolutions.

Figure 5:
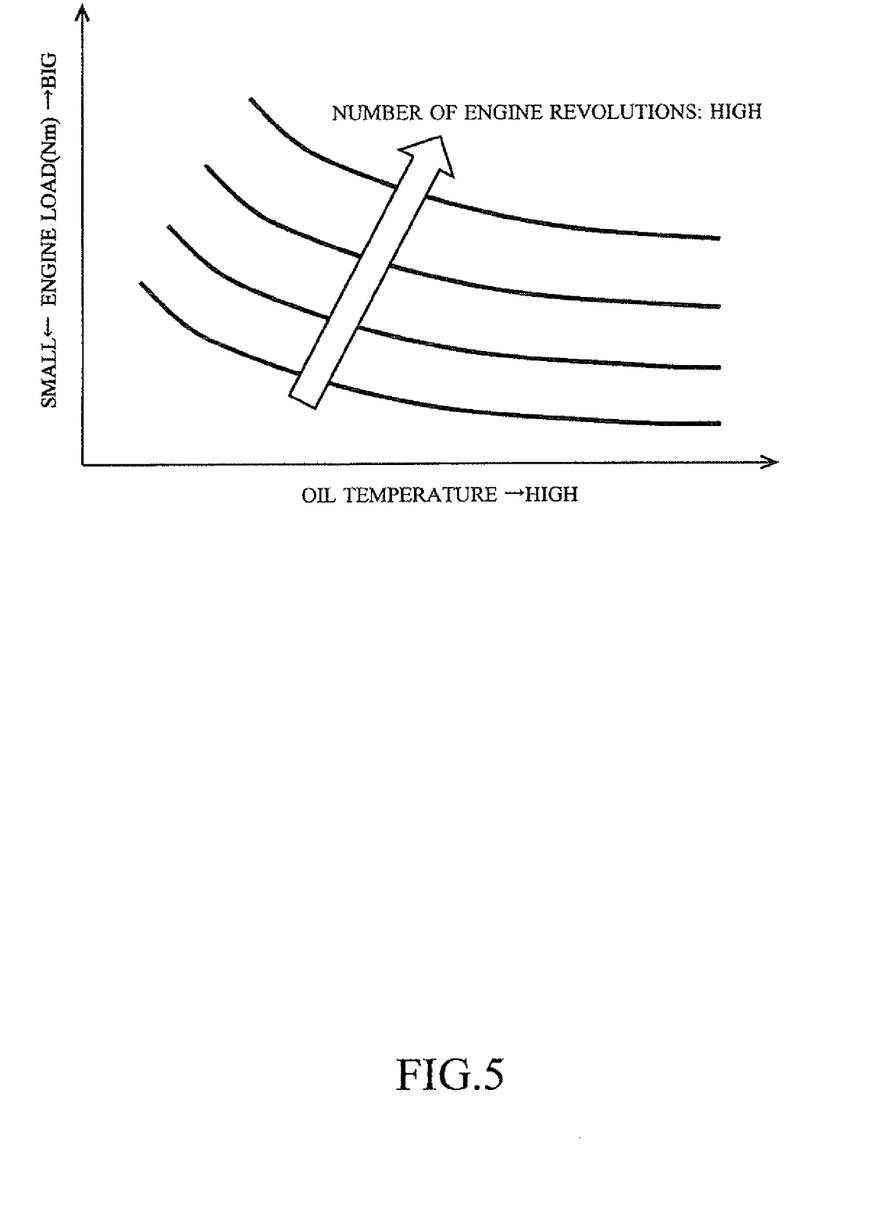
FIG. 5 is a view showing the relation among an oil temperature, a number of engine revolutions and an engine load when the oil pressure is constant.

FIG. 5 is a result of the measurement of the relation among the oil temperature, the number of engine revolutions per unit time and the engine load in cases where the oil pressure is constant. According to the measurement result of FIG. 5, even if the oil pressure and the oil temperature are constant, there is a tendency that the higher the number of engine revolutions per unit time, the larger becomes the engine load. For this reason, in cases where the actual number of engine revolutions is higher than the reference number of revolutions, it is necessary to correct the first reference load Foil01 so as to increase it, whereas in cases where the actual number of engine revolutions is lower than the reference number of revolutions, it is necessary to correct the first reference load Foil01 so as to decrease it.

Accordingly, the ECU 7 calculates an engine load (hereinafter referred to as a "first engine load Foil1") in the actual number of engine revolutions by correcting the first reference load Foil01 with a correction coefficient (hereinafter referred to as a "revolution number correction coefficient") based on the actual number of engine revolutions.

Figure 6:
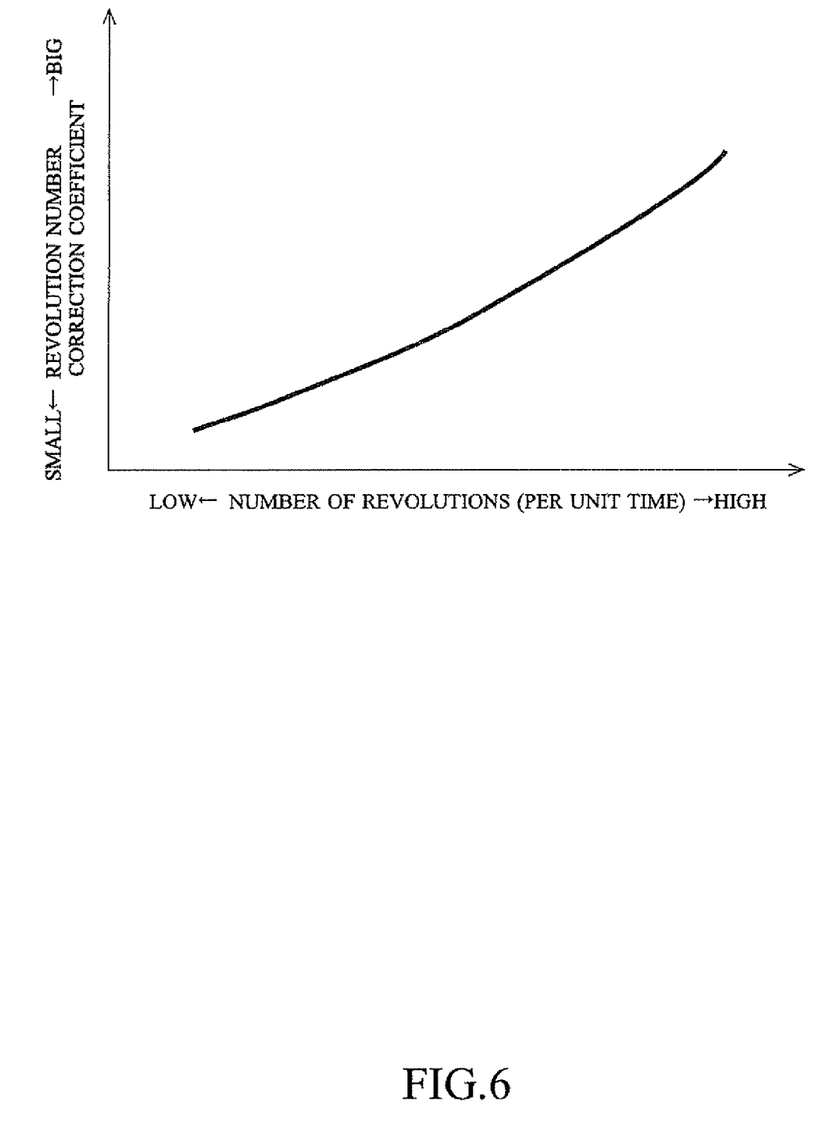
FIG. 6 is a view showing the relation between a number of engine revolutions and a revolution number correction coefficient.

FIG. 6 is a view showing the relation between the revolution number correction coefficient and the number of engine revolutions per unit time. The revolution number correction coefficient shown in FIG. 6 is a value which is obtained by dividing the engine load (the engine load measured under the constant number of engine revolutions per unit time, similar to FIG. 4) in each number of engine revolutions per unit time by the reference load. The relation shown in FIG. 6 is assumed to have been mapped beforehand by an adaptation operation which makes use of experiments, etc.

The ECU 7 calculates the revolution number correction coefficient by making use of a map shown in FIG. 6 with the use of the actual number of engine revolutions as an argument. Subsequently, the ECU 7 calculates the first engine load Foil1 by multiplying the above-mentioned first reference load Foil01 by the revolution number correction coefficient obtained from FIG. 6.

Subsequently, by using, as a parameter, an oil temperature (hereinafter referred to as a "second temporary oil temperature Toil20") which will be detected by the second oil temperature sensor 81 in cases where it is assumed that the oil heater 11 has been operated, the ECU 7 calculates by estimation an engine load after the operation of the oil heater 11 (hereinafter referred to as a "second engine load Foil2").

The second temporary oil temperature Toil20 can be calculated by using, as parameters, the first oil temperature Toil1, an amount of heating of the oil heater 11 (an amount of current supplied to the oil heater 11 from the alternator 6), and an amount of oil passing through the oil heater 11 per unit time. When the second temporary oil temperature Toil20 is calculated in this manner, the ECU 7 calculates the second engine load Foil2 according to the same procedure as in the above-mentioned first engine load Foil1.

When the first engine load Foil1 and the second engine load Foil2 are calculated, the ECU 7 will calculate the amount of decrease $\Delta$Feng (=Foil2−Foil1) of the engine load by subtracting the first engine load Foil1 from the second engine load Foil2.

By carrying out the processing of S105 according to the above-mentioned procedure, a first calculation unit and a second calculation unit according to the present invention are achieved.

Here, a return is made to the oil temperature control routine of FIG. 3, and the ECU 7 advances to step S106. In step S106, the ECU 7 makes a comparison between the amount of decrease $\Delta$Feng and the amount of increase $\Delta$Talt of the engine load which have been calculated in the above-mentioned step S105. That is, the ECU 7 determines whether the amount of decrease $\Delta$Feng of the engine load is larger than the amount of increase $\Delta$Talt.

In cases where an affirmative determination ($\Delta$Feng>$\Delta$Talt) is made in the above-mentioned step S106, the ECU 7 goes to S107 and permits the power generation operation of the alternator 6 for the purpose of causing the oil heater 11 to operate. In this case, the oil heater 11 can be operated, without causing an increase in the engine load. As a result, the friction of the internal combustion engine 1 can be reduced without inducing an increase in the fuel consumption.

In cases where a negative determination is made in the above-mentioned step S106 ($\Delta$Feng≤$\Delta$TalT), the ECU 7 advances to step S108.

In S108, the ECU 7 determines whether the amount of charge SOC of the battery 12 is equal to or larger than a fourth predetermined value $\epsilon$.

The fourth predetermined value $\epsilon$ is a lower limit value of the amount of charge at which it can be considered that the state (amount) of charge of the battery 12 is not less than the above-mentioned third predetermined value $\gamma$ in cases where the oil heater 11 is caused to operate by making use of the electric power of the battery 12, and it has been calculated beforehand by an adaptation operation which makes use of experiments, etc. Here, note that the fourth predetermined value $\epsilon$ corresponds to a specified amount according to the present invention.

In cases where an affirmative determination is made in the above-mentioned step S108 (SOC≥$\epsilon$), the charge state of the battery 12 is in a state capable of operating the oil heater 11, so the ECU 7 causes the oil heater 11 to operate by means of the electric power of the battery 12. That is, the ECU 7 inhibits, first in step S109, the power generation operation of the alternator 6 for the purpose of causing the oil heater 11 to operate, and then in step S110, tries to raise the temperature of the oil by supplying electric power from the battery 120 to the oil heater 11. In this case, the friction of the internal combustion engine 1 can be reduced without inducing an increase in the fuel consumption.

In addition, in cases where a negative determination is made in the above-mentioned step S108 (SOC<$\epsilon$), the charge state of the battery 12 is in a state incapable of operating the oil heater 11, so the ECU 7 causes the oil heater 11 to operate by carrying out the regenerative power generation of the alternator 6 during deceleration of the vehicle. That is, the ECU 7 determines in step S111 whether the vehicle is slowing down, or in other words, whether the vehicle is in a state where the rotational force of a drive wheel(s) of the vehicle is inputted to the internal combustion engine 1 (i.e., in a state where the alternator 6 can be caused to operate by the rotational force of the drive wheel(s)). In cases where an affirmative determination is made in step S111, the ECU 7 goes to S107 and permits the power generation operation of the alternator 6 for the purpose of causing the oil heater 11 to operate. Here, note that in cases where a negative determination is made in step S111, the ECU 7 ends the execution of this routine, without causing the alternator 6 to operate.

By carrying out the processing of steps S106 through S111 by means of the ECU 7, a control unit according to the present invention is achieved.

According to the embodiment as described above, except for the case where the amount of charge of the battery is insufficient, the friction of the internal combustion engine 1 can be reduced without inducing an increase in the fuel consumption.

Second Embodiment

Next, reference will be made to a second embodiment of the present invention based on FIGS. 7 and 8. Here, a construction different from that of the above-mentioned first embodiment will be described, and an explanation of the same construction will be omitted.

The difference between this embodiment and the above-mentioned first embodiment is that in the above-mentioned first embodiment, oil is heated by making use of the electrical energy generated by the alternator, but in contrast thereto, in this embodiment, oil is heated by making use of the heat energy generated by an alternator.

Figure 7:
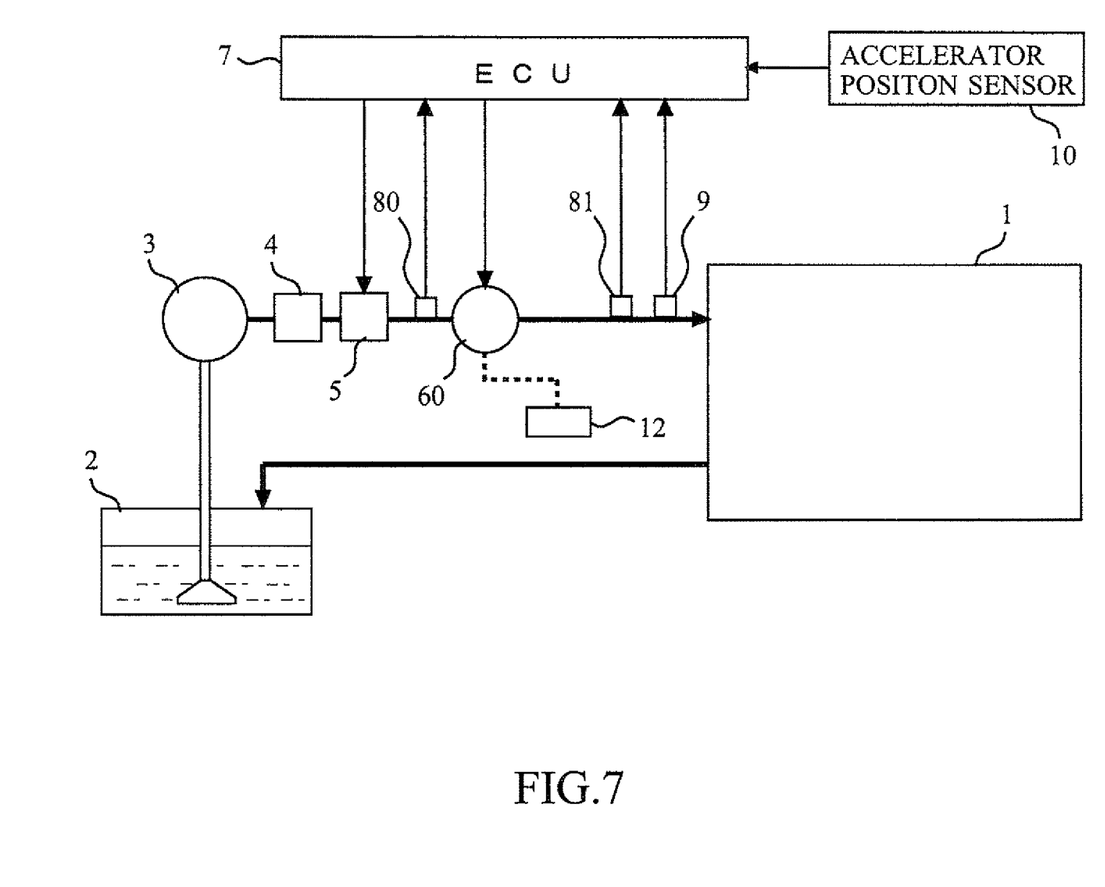
FIG. 7 is a view showing the schematic construction of a lubrication system of an internal combustion engine in a second embodiment.

FIG. 7 is a view showing the schematic construction of a lubrication system of an internal combustion engine in this second embodiment. In FIG. 7, the lubrication system of an internal combustion engine is provided with an alternator 60 in place of an oil heater. The alternator 60 of this embodiment is constructed in such a manner that direct heat exchange can be made between the alternator and the oil.

As a method of achieving heat exchange between the alternator 60 and the oil, there can be exemplified a method in which an oil passage is formed in a housing of the alternator 60 whereby the heat of a rotator, etc., is made to transmit to the oil through a wall surface of the housing, a method in which oil is caused to flow through or disperse into the interior of the alternator 60 whereby the heat of a rotator (rotor), etc., is made to be transmitted to the oil, or the like. Thus, by constructing the alternator 60 in this manner, a heating mechanism according to the present invention is achieved.

Next, reference will be made to oil temperature control in this embodiment in line with FIG. 8. FIG. 8 is a flow chart showing an oil temperature control routine in this embodiment. In FIG. 8, the same symbols are attached to the same processes as those in the above-mentioned oil temperature control routine of FIG. 3.

Figure 8:
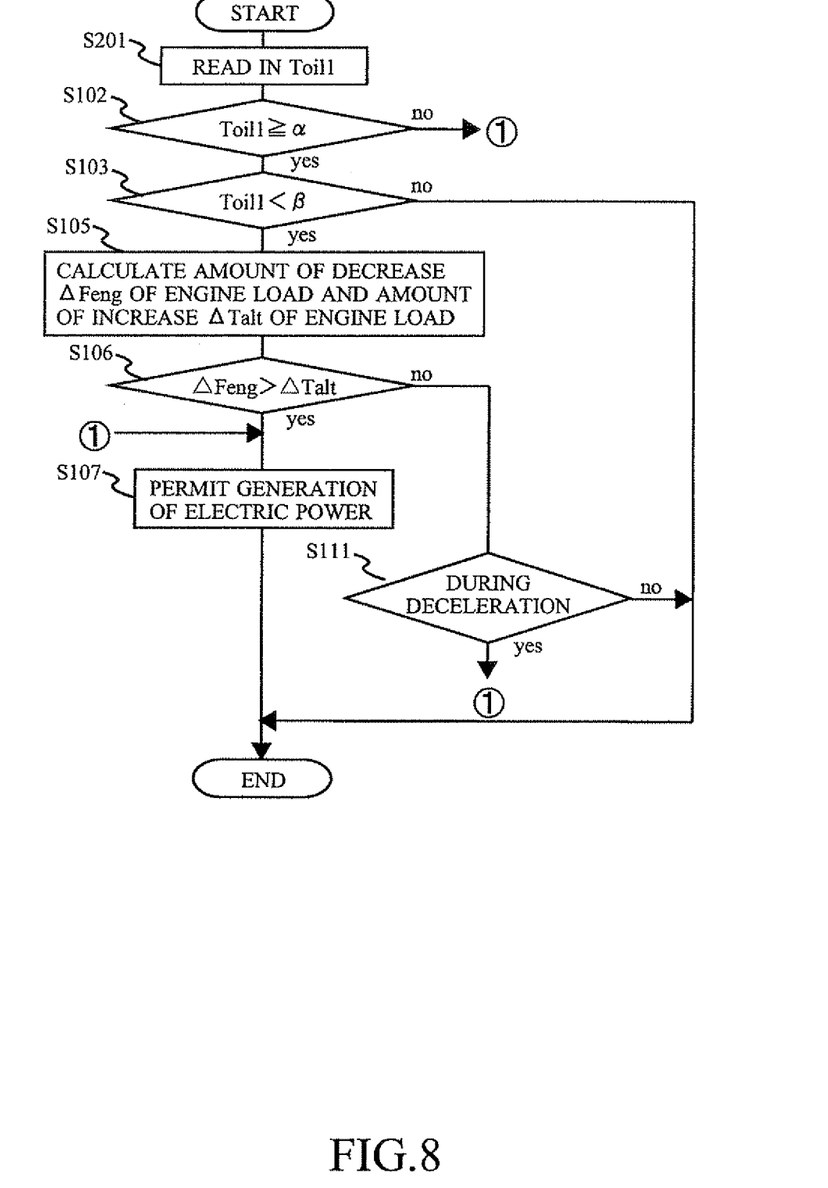
FIG. 8 is a flow chart showing an oil temperature control routine in the second embodiment.

In the oil temperature control routine of FIG. 8, the ECU 7 executes step S201 in place of the above-mentioned step S101 in FIG. 3. In step S201, the ECU 7 reads in the output signal (first oil temperature) Toil1 of the first oil temperature sensor 80.

After the execution of the processing of above-mentioned step S201, the ECU 7 advances to step S102. In cases where an affirmative determination is made in steps S102 and S103, respectively, the ECU 7 carries out the processes of steps S105 and S106 in a sequential manner. In that case, in step S105, the amount of decrease ΔFeng of the engine load at the time when the oil has been raised in temperature due to the heat generated when the alternator 60 carries out the power generation operation and the amount of increase ΔTalt of the engine load at the time when the alternator 60 carries out the power generation operation for the purpose of heating the oil are calculated. The methods of calculating the amount of decrease ΔFeng and the amount of increase ΔTalt of the engine load are the same as those in the above-mentioned first embodiment.

In cases where a negative determination (ΔFeng≤ΔTalt) is made in step S106, the ECU 7 goes to step S111 and permits the power generation operation of the alternator 60 for the purpose of heating the oil only during the deceleration of the vehicle.

According to this embodiment as described above, the friction of the internal combustion engine 1 can be reduced without inducing an increase in the fuel consumption.

Third Embodiment

Next, reference will be made to a third embodiment of the present invention based on FIG. 9. Here, a construction different from that of the above-mentioned first embodiment will be described, and an explanation of the same construction will be omitted.

The difference between this embodiment and the above-mentioned first embodiment is that in the above-mentioned first embodiment, oil is heated by making use of the electrical energy generated by the alternator, but in contrast thereto, in this embodiment, oil is heated by making use of the electrical energy and the heat energy generated by an alternator.

Figure 9:
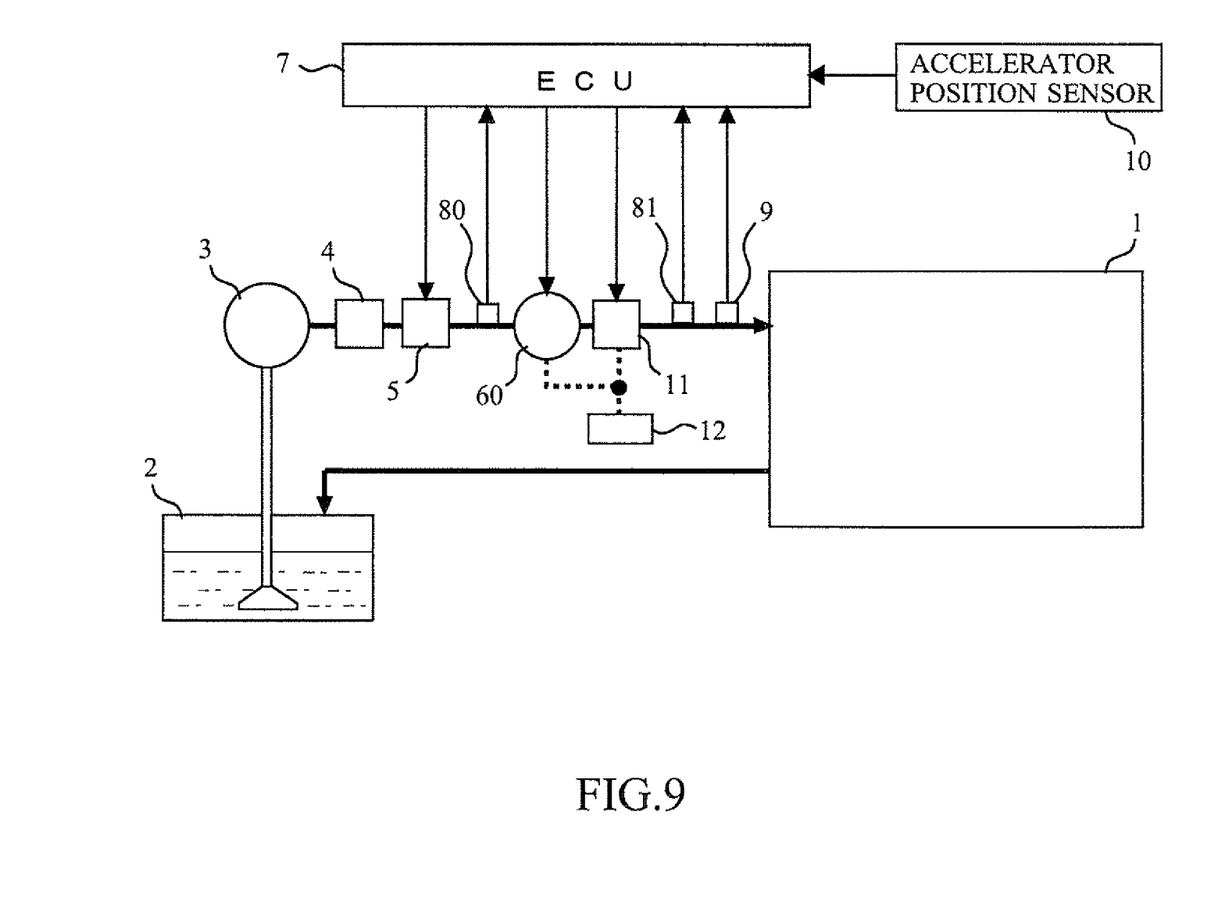
FIG. 9 is a view showing the schematic construction of a lubrication system of an internal combustion engine in a third embodiment.

FIG. 9 is a view showing the schematic construction of a lubrication system of an internal combustion engine in this third embodiment. In FIG. 9, the lubrication system of an internal combustion engine is provided with an oil heater 11 and an alternator 60. Similar to the above-mentioned second embodiment, the alternator 60 of this embodiment is constructed in such a manner that the heat generated by this alternator 60 can be transmitted to oil.

According to such a construction, in cases where the oil heater 11 is caused to operate, the oil is heated by the heat generated by the oil heater 11, and in addition thereto, by the heat generated by the alternator 60, too. For that reason, the amount of decrease ΔFeng of the engine load at the time when the alternator 60 has been operated for the purpose of the operation of the oil heater 11 becomes larger than that in cases where the oil is heated only by the oil heater 11. As a result, the same effects as in the above-mentioned first embodiment can be obtained, and at the same time, it is possible to increase an opportunity in which the oil heater 11 can be caused to operate.

DESCRIPTION OF THE REFERENCE NUMERALS AND SYMBOLS 1 internal combustion engine
2 oil storage tank
3 oil pump
4 oil filter
5 oil cooler
6 alternator
7 ECU
9 oil pressure sensor
10 accelerator position sensor
11 oil heater
12 battery
50 heat exchanger
51 flow rate regulating valve
60 alternator
80 first oil temperature sensor
81 second oil temperature sensor

The invention claimed is:

1. A lubrication system of an internal combustion engine comprising:
a generator configured to generate electricity by making use of the power generated by the internal combustion engine;
a heating mechanism configured to heat lubricating oil of the internal combustion engine by making use of the energy generated when said generator carries out a power generation operation;
a first detection unit configured to detect the temperature of the lubricating oil before the lubricating oil passes through said heating mechanism;
a first calculation unit configured to calculate an amount of decrease of an engine load at a time of assuming that said heating mechanism has heated the lubricating oil by the use of a detected value of said first detection unit as a parameter before operation of said heating mechanism;
a second calculation unit configured to calculate an amount of increase of the engine load at a time of assuming that said heating mechanism has heated the lubricating oil and that the power generation operation of said generator has been carried out in order to supply the energy to said heating mechanism before operation of said heating mechanism; and
a control unit configured to permit said generator to carry out the power generation operation in order to supply energy to said heating mechanism in cases where a result of the calculation of said first calculation unit exceeds a result of the calculation of said second calculation unit,
wherein said first calculation unit calculates a first engine load which is an engine load before operation of said heating mechanism by the use of a temperature of the lubricating oil detected by said first detection unit as a parameter, calculates a second engine load which is an engine load at the time of assuming that said heating mechanism has been operated by the use of, as a parameter, a temperature of the lubricating oil at the time of assuming that said heating mechanism has been operated, and calculates the amount of decrease of the engine load at the time of assuming that said heating mechanism has been operated by subtracting the first engine load from the second engine load.

2. The lubrication system of an internal combustion engine according to claim 1, wherein:
the energy generated when said generator carries out the power generation operation is heat energy; and
said heating mechanism is a heat exchange mechanism configured to transmit to the lubricating oil the heat energy generated when said generator carries out the power generation operation.

3. The lubrication system of an internal combustion engine according to claim 2, wherein:
in cases where a result of the calculation of said first calculation unit is less than a result of the calculation of said second calculation unit, said control unit is further configured to cause said generator to carry out regenerative power generation under a condition in which said generator becomes able to carry out regenerative power generation, and at the same time, to cause said heat exchange mechanism to operate by the heat energy generated by said generator.

4. The lubrication system of an internal combustion engine according to claim 1, wherein:
the energy generated when said generator carries out the power generation operation is electrical energy; and
said heating mechanism is an electric heater configured to convert the electrical energy generated by said generator into heat energy and to transmit the heat energy to the lubricating oil.

5. The lubrication system of an internal combustion engine according to claim 1, wherein:
the energy generated when said generator carries out the power generation operation is heat energy and electrical energy; and
said heating mechanism includes a heat exchange mechanism configured to transmit to the lubricating oil the heat energy generated when said generator carries out the power generation operation, and an electric heater configured to convert the electrical energy generated by said generator into heat energy and to transmit the heat energy to the lubricating oil.

6. The lubrication system of an internal combustion engine according to claim 4, further comprising:
a battery configured to store the electrical energy generated by said generator;
wherein in cases where the result of the calculation of said first calculation unit is less than the result of the calculation of said second calculation unit, said control unit is further configured to cause said electric heater to operate by making use of the electrical energy of said battery.

7. The lubrication system of an internal combustion engine according to claim 6, wherein:
in cases where an amount of charge stored in said battery is less than a preset specified amount, said control unit is further configured to cause said generator to carry out regenerative power generation under a condition in which said generator becomes able to perform regenerative power generation, and at the same time, to supply the energy generated by said generator to said heating mechanism.

8. The lubrication system of an internal combustion engine according to claim 1, further comprising:
a second detection unit configured to detect the temperature of the lubricating oil after the lubricating oil has passed through said heating mechanism;
wherein in cases where a detected value of said second detection unit exceeds a preset upper limit temperature, said control unit is further configured to stop said generator from carrying out the power generation operation in order to supply energy to said heating mechanism.

9. The lubrication system of an internal combustion engine according to claim 5, further comprising:
a battery configured to store the electrical energy generated by said generator;
wherein in cases where the result of the calculation of said first calculation unit is less than the result of the calculation of said second calculation unit, said control unit is further configured to cause said electric heater to operate by making use of the electrical energy of said battery.

10. The lubrication system of an internal combustion engine according to claim 9, wherein:
in cases where an amount of charge stored in said battery is less than a preset specified amount, said control unit is further configured to cause said generator to carry out regenerative power generation under a condition in which said generator becomes able to perform regenerative power generation, and at the same time, to supply the energy generated by said generator to said heating mechanism.

11. The lubrication system of an internal combustion engine according to claim 2, further comprising:
a second detection unit configured to detect the temperature of the lubricating oil after the lubricating oil has passed through said heating mechanism;
wherein in cases where a detected value of said second detection unit exceeds a preset upper limit temperature, said control unit is further configured to stop said generator from carrying out the power generation operation in order to supply energy to said heating mechanism.

12. The lubrication system of an internal combustion engine according to claim 4, further comprising:
a second detection unit configured to detect the temperature of the lubricating oil after the lubricating oil has passed through said heating mechanism;
wherein in cases where a detected value of said second detection unit exceeds a preset upper limit temperature, said control unit is further configured to stop said generator from carrying out the power generation operation in order to supply energy to said heating mechanism.

13. The lubrication system of an internal combustion engine according to claim 5, further comprising:
a second detection unit configured to detect the temperature of the lubricating oil after the lubricating oil has passed through said heating mechanism;
wherein in cases where a detected value of said second detection unit exceeds a preset upper limit temperature, said control unit is further configured to stop said generator from carrying out the power generation operation in order to supply energy to said heating mechanism.

* * * * *